(12) United States Patent
Park et al.

(10) Patent No.: US 12,614,313 B2
(45) Date of Patent: Apr. 28, 2026

(54) DEVICE AND METHOD FOR PROCESSING PLENOPTIC MULTIPLANAR IMAGE

(71) Applicant: Electronics and Telecommunications Research Institute, Daejeon (KR)

(72) Inventors: Seong Jin Park, Daejeon (KR); Do Hyung Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 281 days.

(21) Appl. No.: 18/419,076

(22) Filed: Jan. 22, 2024

(65) Prior Publication Data

US 2024/0273766 A1 Aug. 15, 2024

(30) Foreign Application Priority Data

Feb. 10, 2023 (KR) ........................ 10-2023-0017947

(51) Int. Cl.
| | |
|---|---|
| *G06T 9/00* | (2006.01) |
| *G06T 3/40* | (2006.01) |
| *G06T 7/50* | (2017.01) |
| *G06V 10/56* | (2022.01) |
| *G06V 10/74* | (2022.01) |

(52) U.S. Cl.
CPC ................. *G06T 9/00* (2013.01); *G06T 3/40* (2013.01); *G06T 7/50* (2017.01); *G06V 10/56* (2022.01); *G06V 10/761* (2022.01); *G06T 2207/10024* (2013.01)

(58) Field of Classification Search
CPC .... G06T 9/00; G06T 7/50; G06T 3/40; G06T 2207/10024; G06V 10/56; G06V 10/761
USPC ......................................................... 382/232
See application file for complete search history.

(56) References Cited

U.S. PATENT DOCUMENTS

| | | | |
|---|---|---|---|
| 9,117,385 | B2 | 8/2015 | Todd et al. |
| 2011/0274177 | A1 | 11/2011 | Park et al. |
| 2021/0233282 | A1 | 7/2021 | Kim et al. |
| 2022/0086426 | A1 | 3/2022 | Lee et al. |

FOREIGN PATENT DOCUMENTS

| | | |
|---|---|---|
| KR | 10-1522260 B1 | 5/2015 |
| KR | 10-1798079 B1 | 11/2017 |
| KR | 10-2020-0027699 A | 3/2020 |
| KR | 10-2020-0050842 A | 5/2020 |
| KR | 10-2021-0112555 A | 9/2021 |

OTHER PUBLICATIONS

Bergfelt, Max. "Individual Layer Scaling and Redundancy Reduction of Singleshot Multiplane Images for View Synthesis." Master's Theses in Mathematical Sciences (2023). (Year: 2023).*

(Continued)

*Primary Examiner* — Jonathan S Lee
(74) *Attorney, Agent, or Firm* — Sughrue Mion, PLLC

(57) ABSTRACT

Provided are a device and method for processing a plenoptic multiplanar image (MPI). The device includes a video input part configured to receive plenoptic MPI data and a processor configured to calculate an entropy for each depth level of the plenoptic MPI data, control resolutions of level images according to the entropies, and encode the level images.

20 Claims, 5 Drawing Sheets

(56) References Cited

OTHER PUBLICATIONS

Perra, Cristian. "Lossless plenoptic image compression using adaptive block differential prediction." 2015 IEEE International Conference on Acoustics, Speech and Signal Processing (ICASSP). IEEE, 2015. (Year: 2015).*

Perra, Cristian, and Pedro Assuncao. "High efficiency coding of light field images based on tiling and pseudo-temporal data arrangement." 2016 IEEE International Conference on Multimedia & Expo Workshops (ICMEW). IEEE, 2016. (Year: 2016).*

Scott Janus et al., "Multi-Plane Image Video Compression," IEEE Workshop on Multimedia Signal Processing, Sep. 21, 2020.

* cited by examiner

FIG.3

| | | | |
|---|---|---|---|
| Cam : 1<br>Level : 1,2,3 | Cam : 1<br>Level : 13,14,15 | Cam : 1<br>Level : 19,20,21 | Cam : 2<br>Level : 7,8,9 | Cam : 3<br>Level : 1,2,3 |

Cam : 1, Level : 1,2,3
Cam : 1, Level : 4,5,6
Cam : 1, Level : 7,8,9
Cam : 1, Level : 10,11,12

Cam : 1, Level : 13,14,15 | Cam : 1, Level : 19,20,21
Cam : 1, Level : 16,17,18 | Cam : 1, Level : 22,23,24
Cam : 1, Level : 25,26,27 | Cam : 1, Level : 31,32
Cam : 1, Level : 28,29,30

Cam : 2, Level : 1,2,3
Cam : 2, Level : 4,5,6

Cam : 2, Level : 7,8,9
Cam : 2, Level : 10,11,12

Cam : 2, Level : 13,14,15 | Cam : 2, Level : 19,20,21
Cam : 2, Level : 16,17,18 | Cam : 2, Level : 22,23,24
Cam : 2, Level : 25,26,27 | Cam : 2, Level : 31,32
Cam : 2, Level : 28,29,30

Cam : 3, Level : 1,2,3
Cam : 3, Level : 4,5,6
Cam : 3, Level : 7,8,9
Cam : 3, Level : 10,11,12

DEVICE AND METHOD FOR PROCESSING PLENOPTIC MULTIPLANAR IMAGE

CROSS-REFERENCE TO RELATED APPLICATION

This application claims priority to and the benefit of Korean Patent Application No. 10-2023-0017947, filed on Feb. 10, 2023, the disclosure of which is incorporated herein by reference in its entirety.

BACKGROUND

1. Field of the Invention

The present invention relates to a device and method for processing a plenoptic multiplanar image (MPI).

2. Discussion of Related Art

Multiplanar images (MPIs) are used to generate an image from a user's desired viewpoint. In general, MPIs employ a convolutional neural network (CNN)-based deep neural network technique. MPIs generally have a size of target image size×depth level×4 channels (red green blue alpha (RGBA)). When an MPI has a target image size of 1920× 1080 and 32 depth levels, the MPI has a size of 1920×1080× 32×4. Here, when there are 16 plenoptic cameras, an overall MPI size is 16×1920×1080×32×4, which is about 4 gigabytes (GB). When a still image is rendered with an MPI loaded in advance to the main memory of a personal computer (PC) or the memory of a graphics processing unit (GPU), it is possible to generate the image from a user's desired viewpoint almost at a real-time speed. However, there are limitations to generating content from still images. On the other hand, in the case of a video, even when the latest graphics card with a 48 GB random access memory (RAM) is used, only up to 12 frames of data may be uploaded simultaneously. Even when video data corresponds to 30 frames per second, it is impossible to simultaneously upload the data corresponding to one second or more to the graphics card. When a PC main memory of 128 GB is used, video frames that may be simultaneously uploaded to the main memory correspond to only about one second.

A technology for encoding MPIs into a video according to the related art has been proposed, but there are limitations to using the technology in practice. For example, in the case of separately encoding an image as an RGB part and an alpha part, the number of videos generated for the RGB part is equal to the number of cameras×depth levels, that is, 16×32, the number of videos generated for the alpha part is the same, and the like, and thus it is inappropriate to use the number of files in practice.

The background art of the present invention is disclosed in Korean Patent Application No. 10-2020-0050842 (May 12, 2020).

SUMMARY OF THE INVENTION

The present invention is directed to providing a plenoptic multiplanar image (MPI) processing device and method for generating plenoptic MPIs at a real-time speed, for example, 30 fps or more.

According to an aspect of the present invention, there is provided a device for processing a plenoptic MPI, the device including a video input part configured to receive plenoptic MPI data and a processor configured to calculate an entropy for each depth level of the plenoptic MPI data, control resolutions of level images according to the entropies, and encode the level images.

The processor may perform red green blue (RGB) video encoding by packing each individual level image on the basis of an alpha channel of each element image.

The processor may calculate the entropy on the basis of alpha values obtained by comparing color values of a current element image and color values of surrounding element images at a set depth level of the plenoptic MPI data.

The processor may sort the depth levels by entropy.

The processor may calculate the number of files that are playable in real time according to the entropies and determine a depth level and a resolution for encoding according to the number of files.

The processor may control the resolutions of the level images according to the entropies, bind the level images as groups of a preset number of depth levels, pack the groups in RGB channels, and then encode the level images.

The processor may maintain the level images at the original resolutions or reduce the resolutions of the level images to a low resolution according to the entropies.

The processor may maintain the level images at the original resolutions when the entropies are a preset reference value or more, and reduce the resolutions of the level images to the low resolution when the entropies are less than the preset reference value.

According to another aspect of the present invention, there is provided a method of processing a plenoptic MPI, the method including receiving, by a processor, plenoptic MPI data and calculating, by the processor, an entropy for each depth level of the plenoptic MPI data, controlling resolutions of level images according to the entropies, and encoding the level images.

The controlling of the resolutions of the level images according to the entropies and the encoding of the level images may include packing, by the processor, individual level images on the basis of an alpha channel of the plenoptic MPI data to perform RGB image encoding.

The controlling of the resolutions of the level images according to the entropies and the encoding of the level images may include calculating, by the processor, the entropy on the basis of alpha values obtained by comparing color values of a current element image and color values of surrounding element images at a set depth level of the plenoptic MPI data.

The controlling of the resolutions of the level images according to the entropies and the encoding of the level images may include sorting, by the processor, the depth levels by entropy.

The controlling of the resolutions of the level images according to the entropies and the encoding of the level images may include calculating, by the processor, the number of files that are playable in real time according to the entropies and determining a depth level and a resolution for encoding according to the number of files.

The controlling of the resolutions of the level images according to the entropies and the encoding of the level images may include controlling, by the processor, the resolutions of the level images according to the entropies, binding the level images as groups of a preset number of depth levels, packing the groups in RGB channels, and then encoding the level images.

The controlling of the resolutions of the level images according to the entropies and the encoding of the level images may include maintaining, by the processor, the level images at the original resolutions or reducing the resolutions of the level images to a low resolution according to the entropies.

The controlling of the resolutions of the level images according to the entropies and the encoding of the level images may include maintaining, by the processor, the level images at the original resolutions when the entropies are a preset reference value or more, and reducing the resolutions of the level images to the low resolution when the entropies are less than the preset reference value.

According to another aspect of the present invention, there is provided a method of processing a plenoptic MPI, the method including decoding and unpacking, by a processor, a video file which is encoded on the basis of alpha values of plenoptic MPI data to generate level images and controlling, by the processor, resolutions of the level images. The video file is a file encoded by calculating entropies for depth levels of the plenoptic MPI data and controlling resolutions of the level images according to the entropies.

The controlling of the resolutions of the level images may include restoring, by the processor, the resolutions of individual level images to a restoration resolution according to whether the resolutions of the level images are a low resolution.

The method may further include decoding and unpacking, by the processor, RGB channels of the video file to generate a plurality of plenoptic element images and a plurality of level images.

The method may further include rendering, by the processor, element images generated through the RGB channels and level images generated on the basis of the alpha values to generate a plenoptic MPI from a viewpoint desired by a user.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

FIG. 3 is an example view of an arrangement of a plenoptic MPI according to an exemplary embodiment of the present invention;

DETAILED DESCRIPTION OF EXEMPLARY EMBODIMENTS

Figure 1:
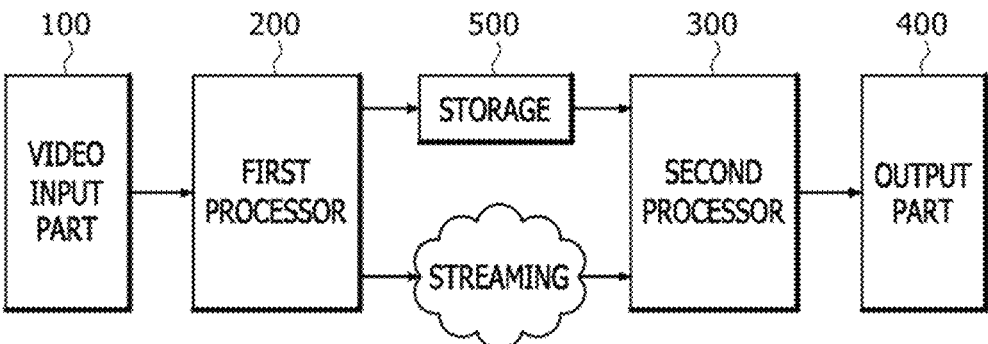
FIG. 1 is a block diagram of a device for processing a plenoptic multiplanar image (MPI) according to an exemplary embodiment of the present invention.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium.

The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosur+L8e may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked," "coupled," or "connected" to another component, it is understood that not only a direct connection relationship but also an indirect connection relationship through an intermediate component may also be included. In addition, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, exemplary embodiments that include other components in addition to the components described in the various embodiments are also included in the scope of the present disclosure.

Hereinafter, a device and method for processing a plenoptic multiplanar image (MPI) according to exemplary embodiments of the present invention will be described. In this process, the thicknesses of lines, the sizes of components, and the like shown in drawings may be exaggerated for the purpose of clarity and convenience of description. Also, terms to be described below are defined in consideration of functions in the present invention, and the terms may vary depending on the intention of a user or operator or precedents. Therefore, these terms are to be defined on the basis of the overall content of the specification.

Figure 2:
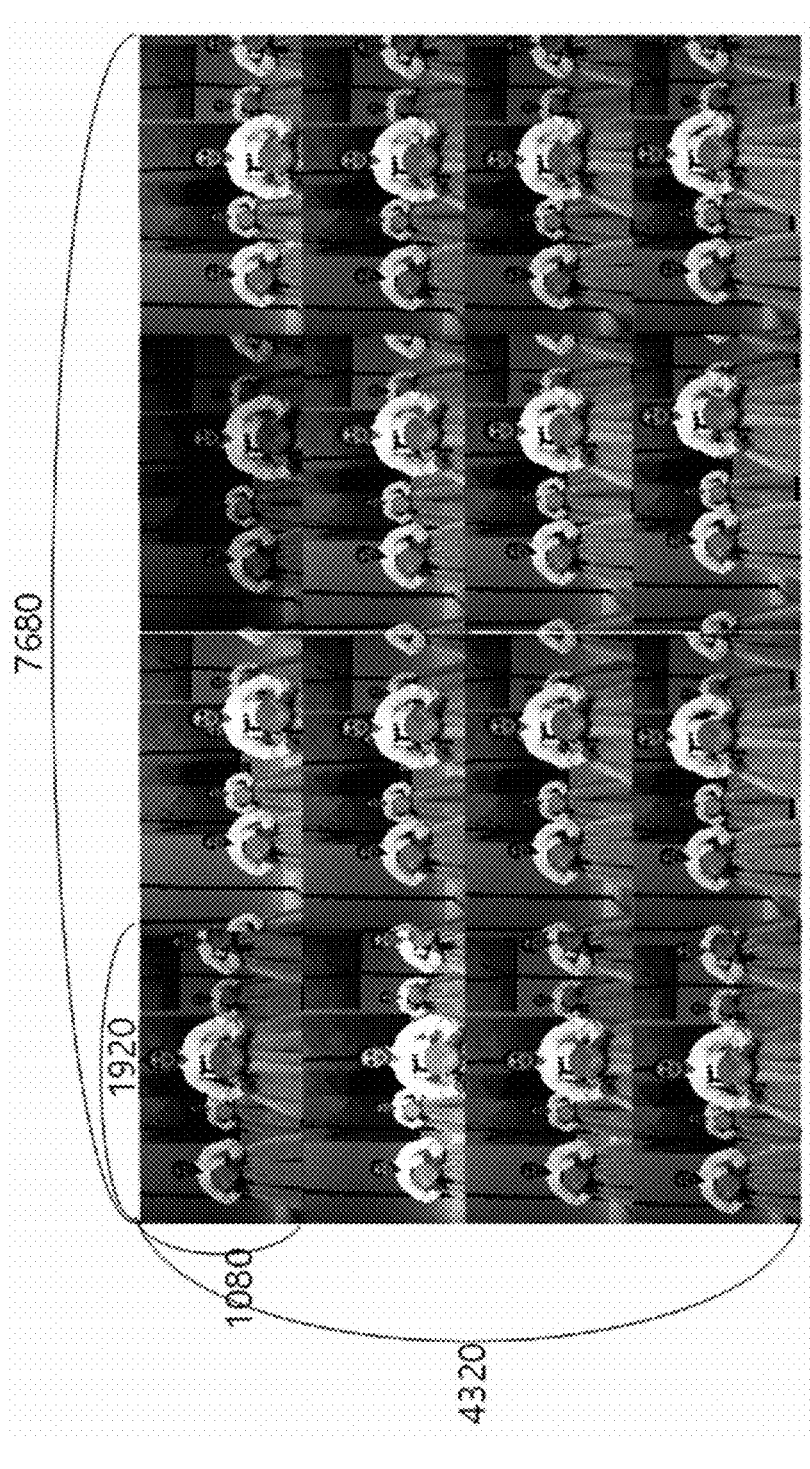
FIG. 2 is an example view of a plenoptic MPI according to an exemplary embodiment of the present invention.

FIG. 1 is a block diagram of a device for processing a plenoptic MPI according to an exemplary embodiment of the present invention, FIG. 2 is an example view of a plenoptic MPI according to an exemplary embodiment of the present invention, and FIG. 3 is an example view of an arrangement of a plenoptic MPI according to an exemplary embodiment of the present invention.

Referring to FIG. 1, a device for processing a plenoptic MPI according to an exemplary embodiment of the present invention includes a video input part 100, a first processor 200, a second processor 300, and an output part 400.

The video input part 100 receives plenoptic MPI data captured by a plurality of cameras on the basis of at least one camera array.

The video input part 100 receives plenoptic MPI data which is m×n pieces of imaging-synchronized video data from an array of m×n cameras and inputs the plenoptic MPI data to the first processor 200.

The plenoptic MPI data may be obtained by storing images captured by the cameras without any change.

The first processor 200 generates a plenoptic MPI for the plenoptic MPI data input from the video input part 100.

The plenoptic MPI data includes a target image size, depth levels, and a red green blue alpha (RGBA) channel. For example, the plenoptic MPI data may include a target image size of 1920×1080, 32 depth levels, and RGBA channels.

Here, the first processor 200 performs graphics processing unit (GPU)-based image encoding by packing individual plenoptic element images on the basis of RGB channels.

Also, the first processor 200 calculates an entropy for each depth level of the plenoptic MPI data on the basis of an A channel and packs level images at their original resolutions or reduced resolutions according to the entropies. In this case, the first processor 200 calculates an entropy for each depth level of the plenoptic MPI data and packs level images at their original resolutions or reduced resolutions according to the entropies, thereby generating a video with a real-time speed of 30 fps or more.

More specifically, the first processor 200 extracts color values of a current element image and color values of surrounding element images at a set depth level of the plenoptic MPI data.

An alpha value is the similarity between color values acquired from the current element image and the surrounding element images at the set depth level.

A depth level acquired from the current element image and the surrounding element images at the set depth level corresponds to a depth value of a corresponding object location like stereo matching.

The first processor 200 generates a viewpoint image desired by a user using the color values and the MPI data. In this case, the first processor 200 calculates a weighted average using alpha values, and thus a pixel with a large alpha value may mainly be taken into consideration.

When the alpha value is large, that is, when the color values acquired from the current element image and the surrounding element images are similar to each other, the first processor 200 uses the current element image without any change.

In other words, when the current element image is used without any change instead of taking color parts at each level of each MPI, it is possible to restore a relatively very similar MPI if not a perfect MPI.

Therefore, it is possible to encode only one RGB image instead of as many RGB images as there are depth levels.

In the case of applying this to all camera images, as many RGB images as there are cameras may be encoded. Here, when an encoder for 8K images of H.265 which may be handled by a GPU encoder is used as the first processor 200, 16 1920×1080 element images can be encoded at a time.

To encode an alpha part of an MPI, it may be measured how important alpha values are for each level of the MPI.

To this end, the first processor 200 calculates an entropy for each level of the MPI data on the basis of alpha values.

A large entropy represents that there are many meaningful alpha values in the level image, and a small entropy represents that there are few meaningful alpha values in the level image. Accordingly, the first processor 200 controls the resolution of a level image according to the entropy.

When an entropy is a reference value or more, that is, the entropy is relatively large, the first processor 200 maintains the level image at its original resolution.

On the other hand, when an entropy is less than a reference value, that is, the entropy is relatively small, the first processor 200 reduces the resolution of the level image to a low resolution. In the case of a relatively small entropy, even when the resolution is reduced to a low resolution, errors which are generated thereafter during restoration by decoding are not large.

The reference value is an entropy which is a criterion for determining the amount of meaningful alpha values in a level image.

As described above, the first processor 200 calculates entropies on the basis of alpha values and then sorts depth levels on the basis of the entropies.

Subsequently, the first processor 200 calculates the number of files that are playable in real time.

The first processor 200 determines a depth level and a resolution for encoding according to the calculated number of files. In other words, the first processor 200 adaptively determines which depth level to encode at what resolution on the basis of the calculated number of files.

When the depth level and resolution for encoding are determined, the first processor 200 binds the 32 depth levels as groups of a predetermined number of depth levels, for example, three depth levels, packs the groups in RGB channels, and then encodes the level images.

Referring to FIG. 3, Cam indicates a camera number.

Level indicates an order of entropy which is calculated on the basis of alpha values. In other words, level 1 represents a depth level at which the entropy of alpha values is the highest, that is, a depth level with the largest amount of information. Level 32 represents a depth level at which the entropy is the lowest, that is, a depth level with the smallest amount of information. At level 31 or 32, alpha values of most pixels are close to zero.

In the example shown in FIG. 3, an original resolution is maintained up to level 12, and a resolution reduced to ¼ of the original resolution is used for level 13 and higher. In this case, 11 encoded files are generated from 16 cameras according to the related art, but 6 encoded files are generated according to the present embodiment.

Files encoded and generated by the first processor 200 may be stored in a storage 500 or streamed to the second processor 300.

The second processor 300 receives the files encoded by the first processor 200 from the storage 500 or through streaming and decodes the files to generate a viewpoint image desired by the user.

The processor 300 performs decoding in the reverse order of encoding performed by the first processor 200.

The second processor 300 decodes a GPU-based RGB image to unpack 16 1920×1080 element images.

Also, when an 8 k image is generated through decoding by the GPU, the second processor 300 outputs the image of the original resolution without any change and restores level images of low resolutions to the original resolution through linear interpolation.

Subsequently, the second processor 300 generates a plenoptic MPI from a viewpoint desired by the user by rendering plenoptic element images generated through the RGB channels and individual plenoptic element images generated on the basis of alpha values.

The output part 400 outputs the plenoptic MPI generated by the second processor 300.

Next, a method of processing a plenoptic MPI according to an exemplary embodiment of the present invention will be described with reference to FIGS. 4 and 5.

Figure 4:
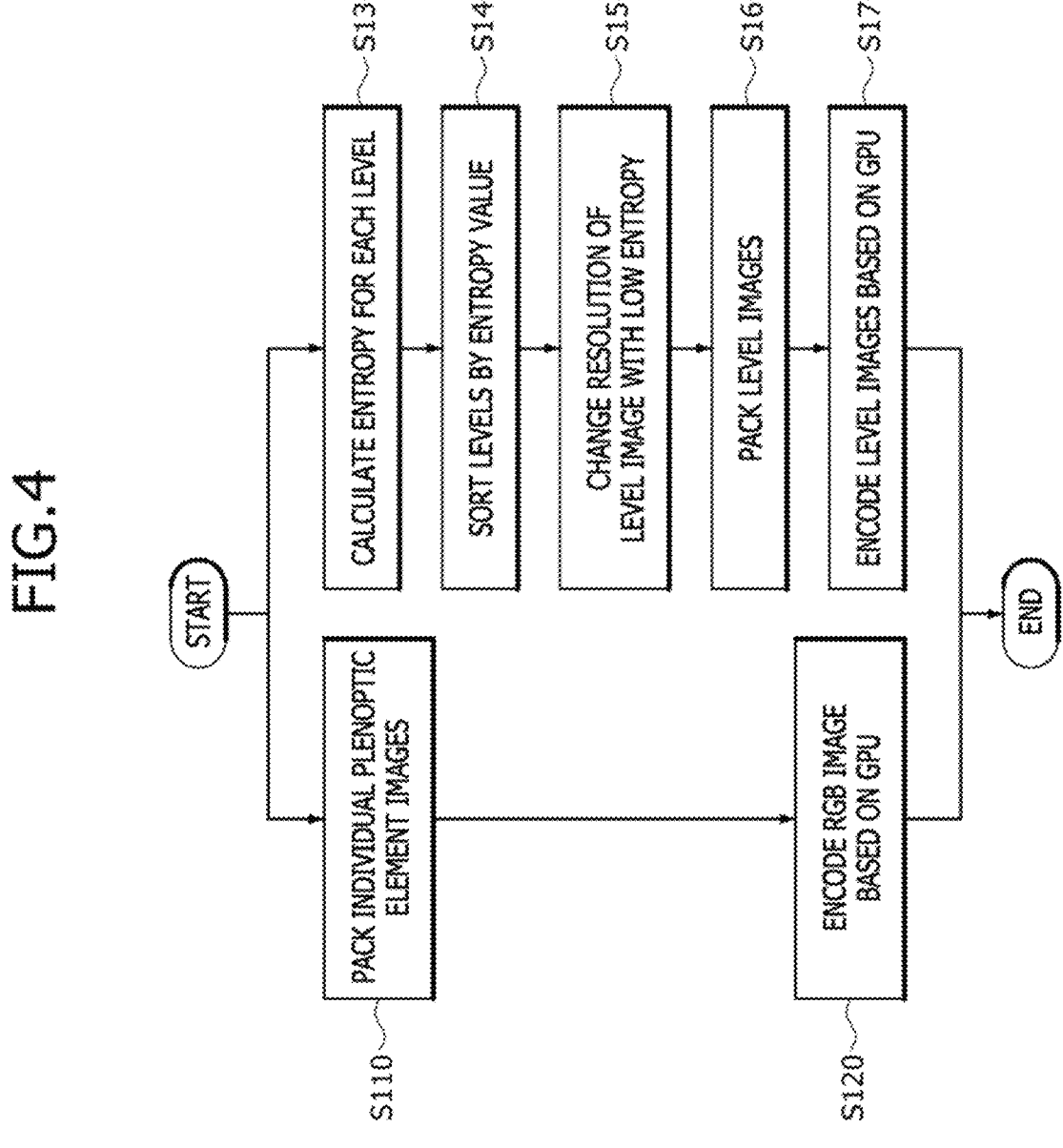
FIG. 4 is a flowchart illustrating a method of encoding a plenoptic MPI according to an exemplary embodiment of the present invention.
Figure 5:
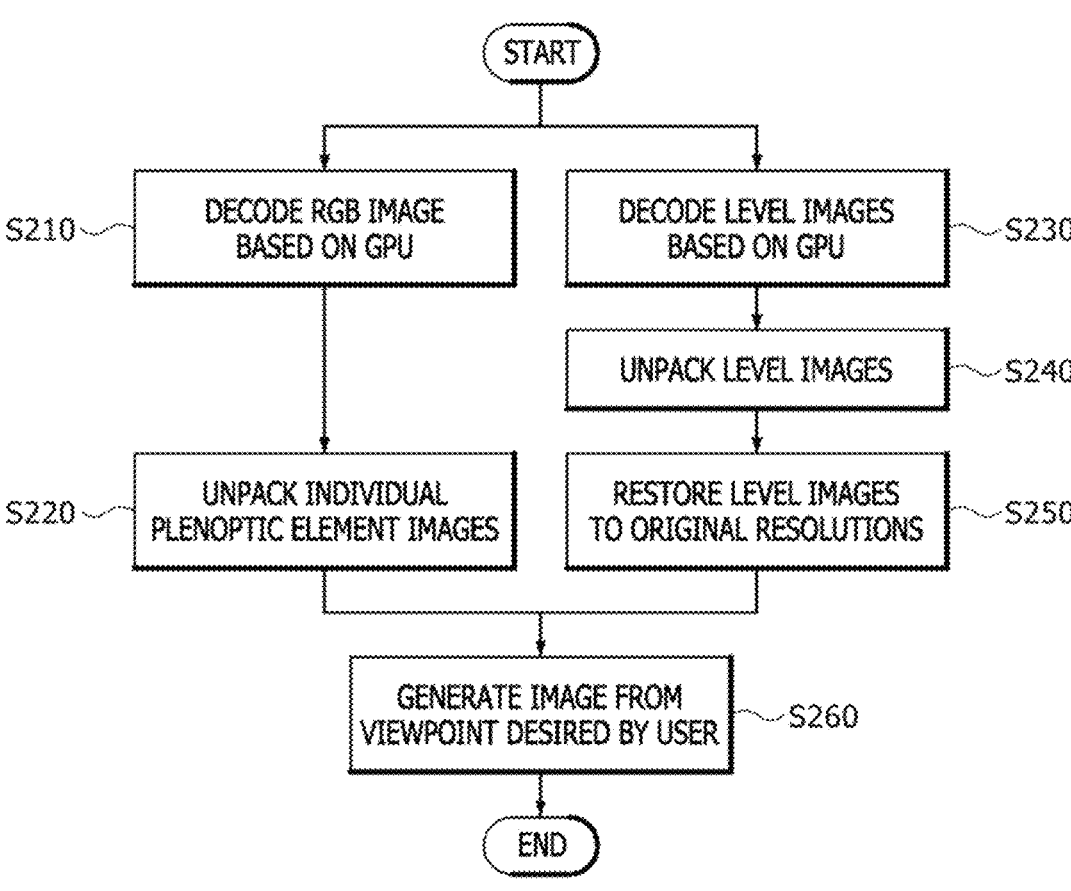
FIG. 5 is a flowchart illustrating a method of decoding a plenoptic MPI according to an exemplary embodiment of the present invention.

FIG. 4 is a flowchart illustrating a method of encoding a plenoptic MPI according to an exemplary embodiment of the present invention, and FIG. 5 is a flowchart illustrating a method of decoding a plenoptic MPI according to an exemplary embodiment of the present invention.

Referring to FIG. 4, the video input part 100 inputs at least one camera array-based plenoptic MPI image captured by cameras to the first processor 200.

The MPI has a target image size of 1920×1080, 32 depth levels, and RGBA channels.

The first processor 200 packs individual plenoptic element images on the basis of RGB channels and performs GPU-based RGB image encoding (S110 and S120).

Also, the first processor 200 calculates an entropy for each depth level of the plenoptic MPI data on the basis of an A channel and packs level images at the original resolution or a reduced resolution according to the entropies.

In other words, the first processor 200 calculates an entropy for each level of the plenoptic MPI data on the basis of alpha values (S130).

When entropies are calculated on the basis of alpha values as described above, the first processor 200 calculates the number of files that are playable in real time and adaptively determines which depth level to encode at what resolution on the basis of the calculated number of files.

The first processor 200 sorts depth levels, which are determined as described above, on the basis of the entropies (S140).

Here, when an entropy is less than a reference value, that is, the entropy is relatively small, the first processor 200 reduces the resolution of the level image to a low resolution because there are few meaningful alpha values in the level image (S150).

On the other hand, when an entropy is the reference value or more, that is, the entropy is relatively large, the first processor 200 maintains the level image at the original resolution because there are many meaningful alpha values in the level image.

Subsequently, the first processor 200 binds the 32 levels as groups of, for example, three levels, packs the groups into R, G, and B channels, and then encodes the R, G, and B channels (S160 and S170).

Files encoded and generated by the first processor 200 may be stored in the storage 500 or streamed to the second processor 300.

Referring to FIG. 5, the second processor 300 receives files from the storage 500 or through streaming.

The second processor 300 decodes an RGB image for RGB channels on the basis of a GPU (S210). Accordingly, plenoptic element images are generated, and the second processor 300 generates 16 1920×1080 images by unpacking the individual plenoptic element images (S220).

Also, the second processor 300 decodes the RGB channels using the GPU and unpacks plenoptic element images on the basis of entropies (S230 and S240).

Here, when an 8 k level image with a high entropy is generated, the second processor 300 outputs the image at the original resolution, and restores level images of low resolutions with relatively low entropies to the original resolution through linear interpolation (S250).

Subsequently, the second processor 300 generates a plenoptic MPI from a viewpoint desired by a user by rendering plenoptic element images generated through the RGB channels and individual plenoptic element images generated on the basis of alpha values (S260).

The output part 400 outputs the plenoptic MPI generated by the second processor 300.

With a device and method for processing a plenoptic MPI according to aspects of the present invention, an entropy is calculated for each level of a plenoptic MPI, and level images are packed at the original resolution without any change or a reduced resolution according to the entropies so that plenoptic MPIs are generated at a real-time speed of 30 fps or more.

Although the present invention has been described above with reference to embodiments illustrated in the drawings, the embodiments are merely illustrative, and those skilled in the art should understand that various modifications and other equivalent embodiments can be made from the embodiments. Therefore, the technical scope of the present invention should be determined from the following claims.

What is claimed is:

1. A device for processing a plenoptic multiplanar image (MPI), comprising:
   a video input part configured to receive plenoptic MPI data; and
   a processor configured to calculate an entropy for each depth level of the plenoptic MPI data, control resolutions of level images according to the entropies, and encode the level images.

2. The device of claim 1, wherein the processor performs red green blue (RGB) video encoding by packing individual element images on the basis of RGB channels of the plenoptic MPI data.

3. The device of claim 1, wherein the processor calculates the entropy on the basis of alpha values obtained by comparing color values of a current element image and color values of surrounding element images at a set depth level of the plenoptic MPI data.

4. The device of claim 1, wherein the processor sorts the depth levels by entropy.

5. The device of claim 1, wherein the processor calculates a number of files that are playable in real time according to the entropies and determines a depth level and a resolution for encoding according to the number of files.

6. The device of claim 1, wherein the processor controls the resolutions of the level images according to the entropies, binds the level images as groups of a preset number of depth levels, packs the groups in RGB channels, and then encodes the level images.

7. The device of claim 1, wherein the processor maintains the level images at original resolutions or reduces the resolutions of the level images to a low resolution according to the entropies.

8. The device of claim 7, wherein the processor maintains the level images at the original resolutions when the entropies are a preset reference value or more, and reduces the resolutions of the level images to the low resolution when the entropies are less than the preset reference value.

9. A method of processing a plenoptic multiplanar image (MPI), comprising:
   receiving, by a processor, plenoptic MPI data; and calculating, by the processor, an entropy for each depth level of the plenoptic MPI data, controlling resolutions of level images according to the entropies, and encoding the level images.

10. The method of claim 9, wherein the controlling of the resolutions of the level images according to the entropies and the encoding of the level images comprise packing, by the processor, individual level images on the basis of red green blue (RGB) channels of the plenoptic MPI data to perform RGB image encoding.

11. The method of claim 9, wherein the controlling of the resolutions of the level images according to the entropies and the encoding of the level images comprise calculating, by the processor, the entropy on the basis of alpha values obtained by comparing color values of a current element image and color values of surrounding element images at a set depth level of the plenoptic MPI data.

12. The method of claim 9, wherein the controlling of the resolutions of the level images according to the entropies and the encoding of the level images comprise sorting, by the processor, the depth levels by entropy.

13. The method of claim 9, wherein the controlling of the resolutions of the level images according to the entropies and the encoding of the level images comprise calculating, by the processor, a number of files that are playable in real time according to the entropies and determining a depth level and a resolution for encoding according to the number of files.

14. The method of claim 9, wherein the controlling of the resolutions of the level images according to the entropies and the encoding of the level images comprise controlling, by the processor, the resolutions of the level images according to the entropies, binding the level images as groups of a preset number of depth levels, packing the groups in RGB channels, and then encoding the level images.

15. The method of claim 9, wherein the controlling of resolutions of the level images according to the entropies and the encoding of the level images comprise maintaining, by the processor, the level images at original resolutions or reducing the resolutions of the level images to a low resolution according to the entropies.

16. The method of claim 15, wherein the controlling of the resolutions of the level images according to the entropies and the encoding of the level images comprise maintaining, by the processor, the level images at the original resolutions when the entropies are a preset reference value or more, and reducing the resolutions of the level images to the low resolution when the entropies are less than the preset reference value.

17. A method of processing a plenoptic multiplanar image (MPI), comprising:

decoding and unpacking, by a processor, a video file which is encoded on the basis of alpha values of plenoptic MPI data to generate element images and level images; and controlling, by the processor, resolutions of the level images, wherein the video file is a file encoded by calculating entropies for depth levels of the plenoptic MPI data and controlling resolutions of the level images according to the entropies.

18. The method of claim 17, wherein the controlling of the resolutions of the level images comprises restoring, by the processor, the resolutions of individual level images to a restoration resolution according to whether the resolutions of the level images are a low resolution.

19. The method of claim 17, further comprising decoding and unpacking, by the processor, red green blue (RGB) channels of the video file to generate a plurality of plenoptic element images.

20. The method of claim 19, further comprising rendering, by the processor, level images generated through the RGB channels and level images generated on the basis of the alpha values to generate a plenoptic MPI from a viewpoint desired by a user.

* * * * *